United States Patent
Sahashi et al.

(10) Patent No.: US 6,692,157 B2
(45) Date of Patent: Feb. 17, 2004

(54) BEARING DEVICE FOR DRIVE WHEEL

(75) Inventors: Koji Sahashi, Shizuoka-ken (JP);
Kazuhiko Hozumi, Shizuoka-ken (JP);
Keisuke Sone, Shizuoka-ken (JP);
Masahiro Ozawa, Shizuoka-ken (JP);
Akira Torii, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/909,981

(22) Filed: Jul. 23, 2001

(65) Prior Publication Data
US 2002/0025093 A1 Feb. 28, 2002

(30) Foreign Application Priority Data
Aug. 10, 2000 (JP) .................................. 2000-243175

(51) Int. Cl.$^7$ ............................................. F16C 19/08
(52) U.S. Cl. ........................................ 384/537; 384/544
(58) Field of Search ................................ 384/537, 544, 384/589, 585, 543

(56) References Cited

U.S. PATENT DOCUMENTS

| 4,893,960 A | 1/1990 | Beier et al. .................. 403/24 |
| 4,986,607 A | 1/1991 | Hofmann et al. ........... 301/124 |
| 5,975,765 A | * 11/1999 | Kawamura .................. 384/537 |

FOREIGN PATENT DOCUMENTS

| EP | 0 873 883 | 10/1998 |
| JP | 11-62951 | 3/1999 |

* cited by examiner

Primary Examiner—Lenard A. Footland
(74) Attorney, Agent, or Firm—Arent Fox Kintner Plotkin & Kahn, PLLC

(57) ABSTRACT

A bearing device for a drive wheel is provided with improved strength of coupling a hub wheel and an outer joint member without significantly raising the manufacturing cost. The bearing device for a drive wheel includes the hub wheel, a constant velocity universal joint and bearings arranged in inner races, the hub wheel, the universal joint and the bearings being unitized, at least the inner race being formed in the outer joint member of the constant velocity universal joint. In the bearing device, the hub wheel and the outer joint member are meshed with each other by way of serrations and coupled to each other by caulking. Undulations of serrations at near a caulked section being filled with plastic deformed part caused by the caulking.

16 Claims, 9 Drawing Sheets

BEARING DEVICE FOR DRIVE WHEEL

BACKGROUND OF THE INVENTION

1. Field of the Invention

The present invention relates to a wheel bearing device for rotatationally supporting a drive wheel relative to the body of an automobile. More specifically, the present invention relates to a bearing device for a drive wheel of the type that includes a hub wheel, a constant velocity universal joint and bearings arranged in rows. In the present invention the hub wheel, the universal joint and the bearings are unitized and the plurality of inner races of the bearings are partially formed in the outer joint member of the constant velocity universal joint on one side.

2. Description of the Related Art

The drive wheels of automobiles including the rear wheels of FR cars, the front wheels of FF cars and all the wheels of 4WD cars are supported in suspension by means of a bearing device for a drive wheel. Known bearing devices for a drive wheel include the one disclosed in Japanese Patent Laid-Open Publication No. Hei. 11-62951.

Referring to FIG. 12 of the accompanying drawings, the bearing device disclosed in the above patent document includes a hub wheel 10, a bearing unit 20 and a constant velocity universal joint 30 that are unitized. One of the paired inner races 12 is formed in the hub wheel 10 while the other one 42 is formed in the outer joint member 40 of the constant velocity universal joint 30. The hub wheel 10 and the outer joint member 40 are coupled to each other by mutual engagement of the female spline 53 and the male spline 55 and caulking the axial end of the outer joint member 40 that is projecting from the hub wheel 10. The female spline 53 is formed on the inner peripheral surface of the hub wheel 10, and the male spline 55 is formed on the outer peripheral surface of the outer joint member 40. Additionally, the male spline 55 of the outer joint member 40 of the bearing device is provided at the opposite lateral sides thereof with cylindrical surfaces 77 and 79 to improve its flexural rigidity or the like. The surfaces 77 and 79 are then engaged with the tooth-front surface of the female spline 53 of the hub wheel 10.

With the structural arrangement of FIG. 12, the cylindrical surfaces and the tooth-front surface of the female spline 53 have to be brought into mutual engagement without any play. Therefore, both the cylindrical surfaces and the tooth-front surface are required to show an enhanced level of precision particularly in terms of coaxial arrangement. Then, both the outer joint member and the hub wheel including their respective splines need to be accurately machined and consequently the manufacturing cost is raised.

SUMMARY OF THE INVENTION

In view of the above-identified circumstances, it is therefore an object of the present invention to improve the strength of coupling the hub wheel and the outer joint member of a bearing device for a drive wheel without significantly raising the manufacturing cost.

According to the present invention, the above object is achieved by providing a bearing device for a drive wheel including a hub wheel, a constant velocity universal joint and bearings arranged in rows, the hub wheel, the universal joint and the bearings being unitized, the plurality of inner races of the bearings being formed partly in the outer joint member of the constant velocity universal joint at a side thereof, the hub wheel and the outer joint member being meshed with each other by way of torque transmission means and coupled to each other by caulking, plastic deformation caused by the caulking supporting the torque transmission means at near the caulked section. As a result of this appropriation, any peripheral play between the hub wheel and the outer joint member can be minimized to improve the strength of coupling them. While any appropriate means may be used for the caulking, the caulking can be realized particularly effectively and efficiently by using a rocking technique.

Furthermore, the above object is also achieved by providing a bearing device for a drive wheel including a hub wheel, a constant velocity universal joint and bearings arranged in rows, the hub wheel, the universal joint and the bearings being unitized, the plurality of inner races of the bearings being formed partly in the outer joint member of the constant velocity universal joint at a side thereof, the hub wheel and the outer joint member being meshed with each other by way of torque transmission means and coupled to each other by caulking, undulations of said torque transmission means at near a caulked section being filled with plastic deformed part caused by said caulking.

Preferably, a bearing device for a drive wheel according to the invention includes the aforementioned caulked section at one end of the torque transmission means in an axial direction and an engaging section engaged at the other end with the hub wheel and the outer joint member without play. Then, the engaging section is tightly engaged in such a way that there is no play between the hub wheel and the outer joint member so that it operates to satisfactorily bear the radial load of the device.

Preferably, the torque transmission means comprises serrations, which may be splines.

When tightly coupling the outer joint member and the hub wheel by caulking, the outer joint member may be engaged at the corresponding axial end thereof with the hub wheel by caulking or alternatively the hub wheel may be engaged at the corresponding end thereof with the outer joint member by caulking.

The axial end of the stem that is to be caulked needs to show ductility to a certain extent. Therefore, preferably, the caulked section is made to show the hardness of the material prior to heat treatment.

When the outer joint member is caulked at the axial end thereof and brought into engagement with the hub wheel, the outer joint member is preferably provided at the axial end with a section to be caulked having a diameter smaller than that of the groove of its serration.

Then, preferably, the serration of the outer joint member is made to show a cut-out profile at the corresponding axial end thereof. With such a profile, the shearing load can be prevented from concentrating and any possible cracks in the caulked section can be avoided when the serration of the outer joint member is made to have the axial end of the bottom of the groove thereof located at the inboard side relative to the corresponding end face of the hub wheel.

Preferably, the serration-engagement of said outer joint member and that of said hub wheel is realized by interference at least at the side opposite to the axial end. When the torque transmission means is provided at and near the caulked section by plastic deformation caused by caulking as described above, the torque is largely borne by the plastically deformed section because the outer joint member and the hub wheel bite each other in the plastically deformed section to eliminate any play therebetween. On the other hand, when the serration-engagement of the outer joint member and the hub wheel is realized by interference at the side opposite to the axial end, the torque is also borne by the interfering section to consequently reduce the torque borne by the plastically deformed section and avoid any possible cracks in the caulked section.

The efficiency of causing the serrations to engage each other can be improved by realizing the serration-engagement by means of clearance fit at the axial end side.

The interference can reliably be formed by tilting either the serration of the outer joint member or that of the hub wheel relative to the axial direction. Alternatively, the interference can be formed by tilting either the serration of the outer joint member or that of the hub wheel relative to the axial direction at the side opposite to the axial end and formed in parallel with the axial direction at the axial end side relative to that side.

The torque transmission means may be formed by arranging undulations on the engaging surfaces of the hub wheel and the outer joint member and caulking the engaging surfaces by at least partly enlarging or reducing the diameters of the engaging surfaces including the undulations. With such an arrangement, the undulations bite the engaging surfaces of the partner members so that the torque can be transmitted by way of the hub wheel and the outer joint member and the strength of coupling the hub wheel and the outer joint member can be improved in order to prevent the caulked section from becoming loose for a long period of time. Undulations may be formed on either or both of the engaging surfaces of said hub wheel and said outer joint member.

The undulations can withstand any efforts trying to crush them and bite the engaging surfaces of the partner members to establish a strengthened plastic coupling effect when they are hardened by heat treatment.

The nature, principle, and utility of the invention will become more apparent from the following detailed description when read in conjunction with the accompanying drawings in which like parts are designated by like reference numerals or characters.

DESCRIPTION OF THE PREFERRED EMBODIMENT

The present invention will now be described with reference to FIGS. 1 through 11 of the accompanying drawings that illustrate the preferred embodiments of the invention.

Figure 1:
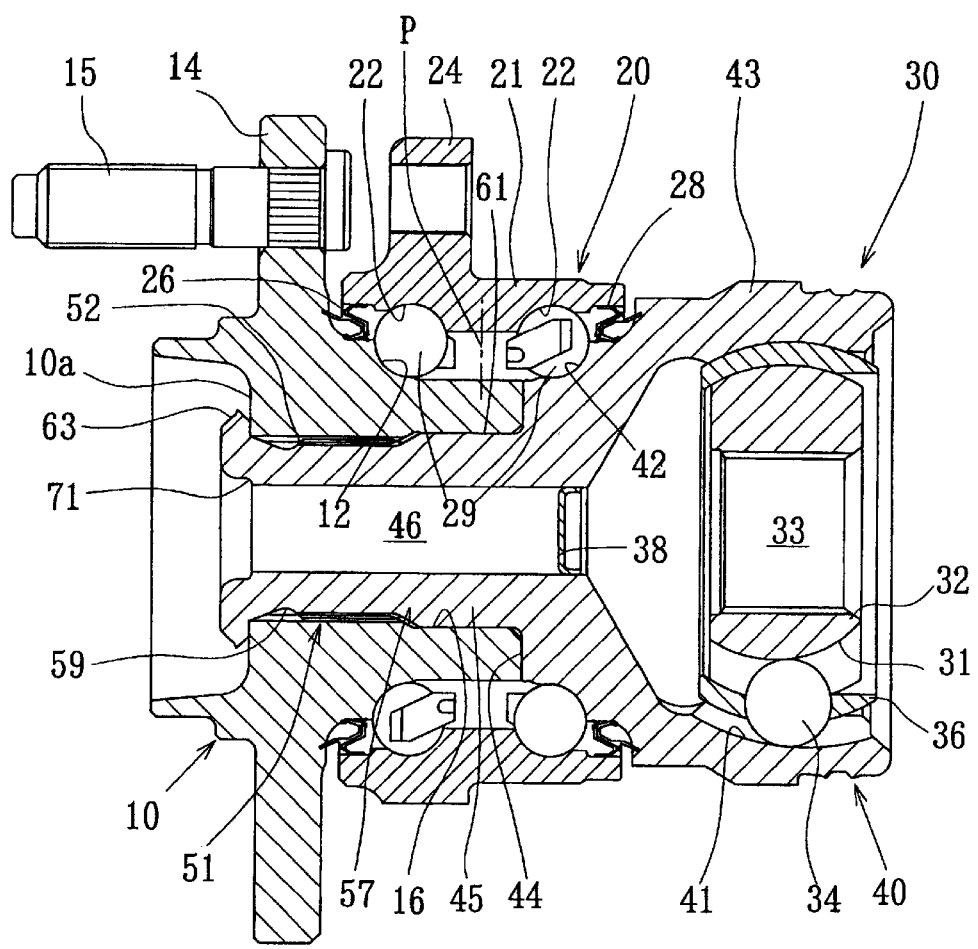
FIG. 1 is a cross sectional view of an embodiment of a bearing device for a drive wheel according to the invention.

Firstly, the embodiment of a bearing device for a drive wheel as illustrated in FIG. 1 includes a hub wheel 10, a bearing unit 20, and a constant velocity universal joint 30 as the principal components. Note that when the car is assembled with the bearing device, the side of the bearing device located close to the outside of the car is referred to as the outboard side, whereas the side located close to the center of the car is referred to as the inboard side. In the drawings (excepting FIG. 11), the left side thereof is the outboard side and the right side is the inboard side.

The hub wheel 10 is provided with a flange 14 for fitting the end of the outboard side to a corresponding drive wheel (not shown). Hub bolts 15 for rigidly securing the wheel disk of the drive wheel to the flange 14 are set in the flange 14 and arranged circumferentially at regular intervals. Inner races 12 are formed on the outer peripheral surface of the hub wheel 10 and located close to the flange 14 at the outboard side. The hub wheel 10 is provided with an axial through bore 16.

The constant velocity universal joint 30 includes an inner joint member 32 that is provided with a track groove 31 arranged along the outer periphery, and an outer joint member 40 provided with a track groove 41 arranged along the inner periphery. Also, there are a plurality of balls 34 arranged between the track groove 31 of the inner joint member 32 and the track groove 41 of the outer joint member 40 and a cage 36 for holding all the balls 34 on the same plane. The inner joint member 32 is provided with an axial through bore 33 and is adapted to be coupled to the drive shaft (not shown). The drive shaft is linked, typically by means of serrations, to the constant velocity universal joint located at the side of the engine. The outer joint member 40 includes a mouth section 43 and a stem section 45 and is engaged with the inner periphery of the through bore 16, of the hub wheel 10, at the stem section 45. The inboard side inner races 42 are formed on the outer peripheral surface of the mouth section 43 at positions located close to the shoulder surface 44 (although the separate inner races 42 may be fitted into the outer periphery of the outer joint member 40). As the shoulder surface 44 of the mouth section 43 abuts the end face of the hub wheel 10, the hub wheel 10 and the outer joint member 40 are axially aligned and the dimensions of the inner races 12 and 42 are defined. In this embodiment the stem section 45 is provided with an axial through bore 46 that is connected with the bottom of the cup-shaped mouth section 43 to make it hollow. Alternatively it may be made completely solid.

The bearing unit 20 includes an outer member 21 and a plurality of rolling elements 29 arranged in rows. The outer member 21 is provided with a flange 24 to be used for fitting the bearing unit 20 to the vehicular body (not shown), and outer races 22 formed on the inner peripheral surface to rotationally receive the rolling elements 29. Thus, the rolling elements 29 are arranged in rows and contained in the spaces defined by the inner races 12 of the hub wheel 10, the inner races 42 of the outer joint member 40 and the outer races 22 of the outer member 21. In other words, the bearing unit 20 includes the outer races 22 arranged in rows, the inner races 12 and 42 arranged in rows, the rolling elements 29 contained in the spaces defined by the inner races 12 and 42, the outer races 22, and the outer member 21. In the illustrated embodiment the rolling elements 29 are realized in the form of angular ball bearings using balls arranged in rows. Alternatively, in the case of very heavy cars, they may be realized in the form of conical rollers as rolling elements also arranged in rows.

The outer member 21 is provided at the opposite terminal openings with respective seals 26 and 28 in order to prevent the grease and the lubricant in the bearing unit from leaking out and external water and foreign objects from entering the bearing unit. Since the through bore 46 of the stem section 45 is connected with the inner space of the mouth section 43, the stem section 45 is also provided at the end of the through hole 45 located close to the mouth section 43 with an end plate 38 for preventing the grease in the mouth section 43 from leaking out. The end plate 38 is made of a material that is lightweight and highly thermally conductive such as aluminum.

Figure 2:
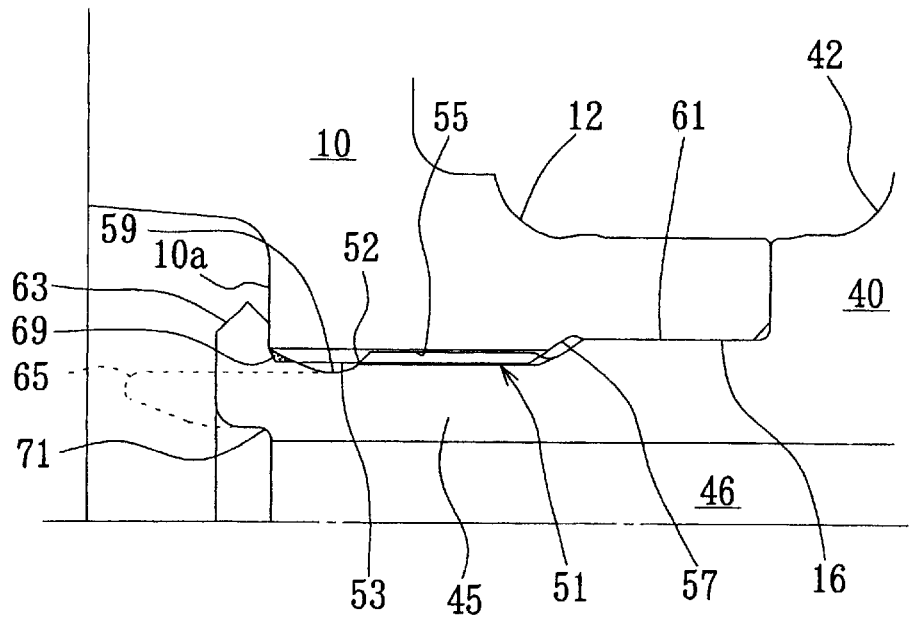
FIG. 2 is an enlarged cross sectional view of the engaging areas of the hub wheel and the outer joint member of the embodiment of FIG. 1.
Figure 3:
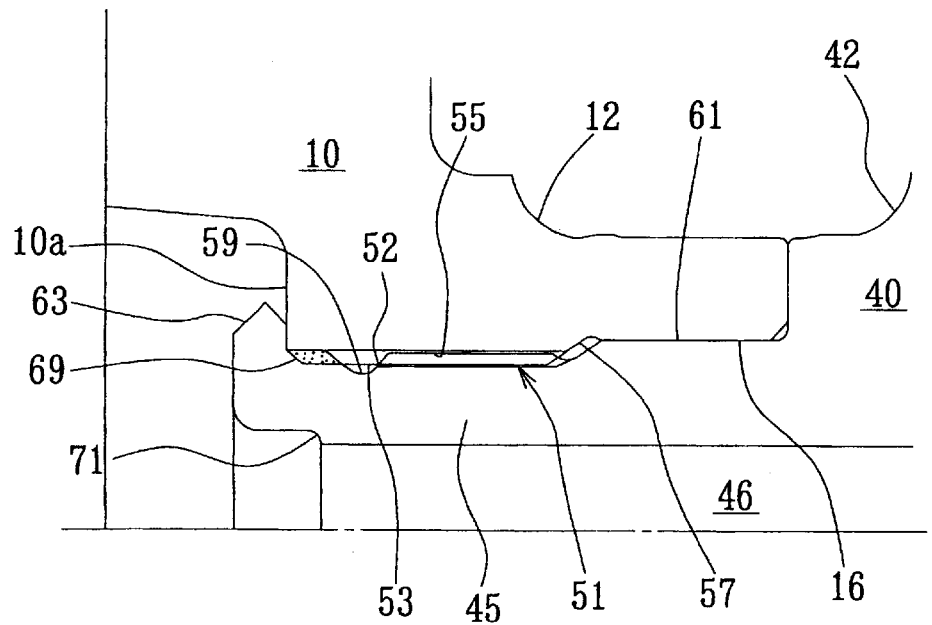
FIG. 3 is another enlarged cross sectional view of the engaging areas of the hub wheel and the outer joint member of the embodiment of FIG. 1.

The hub wheel 10 and the outer joint member 40 of the constant velocity universal joint 30 are coupled to each other by way of torque transmission means 51. The torque transmission means 51 is made to transmit torque from the hub wheel 10 to the outer joint member 40 and vice versa. This is done by causing the undulations formed on the stem section 45 of the outer joint member 40 and those formed on the hub wheel 10 to engage each other peripherally. It may typically be composed of serrations or splines (In the following description, "serrations" will also refer to splines). Large scale diagram FIG. 2 shows the female serration 53 formed on the inner peripheral surface of the hub wheel 10 substantially extending axially from the center of the inner peripheral surface to the end of the outboard side. The male serration 55 formed on the outer peripheral surface of the stem section 45 of the outer joint member 40 covers an area partially engaged with the female serration 53 of the hub wheel 10, or the area that is solely engaged with the inboard side part of the female serration 53 to be more accurate. In other words, the outboard side part of the female serration 53 of the hub wheel 10 refers to an area that is not engaged with the male serration 55 of the outer joint member 40. The area of the inner peripheral surface of the hub wheel 10 located close to the inboard side relative to the female serration 53, and the area of the outer peripheral surface of the outer joint member 40 located close to the outboard side relative to the male serration 55 are provided with the respective escape sections 57 and 59. These escape sections facilitate the machining of the serrations 53 and 55.

The torque transmission means 51 is provided at the inboard side thereof with an engaging section 61 that makes the hub 10 and the outer joint member 40 radially engage each other without any play. In the engaging section 61, the cylindrical outer peripheral surface of the outer joint member 40 and the cylindrical inner peripheral surface of the hub wheel 10 are held in mesh with each other by interference fit. In this way the radial load borne by the hub wheel 10 can also be borne by the stem section 45 of the outer joint member 40 in the engaging section 61.

The hub wheel 10 and the outer joint member 40 are inseparably and plastically coupled to each other along the axial direction by way of caulked section 63. With reference to FIG. 2, the outboard side axial end of the outer joint member 40 is engaged with the hub wheel 10 by caulking. More specifically, the caulking is realized by providing the outboard side axial end of the outer joint member 40 with a cylindrical small diameter section 65 that is to be caulked as indicated by the broken lines in FIG. 2, and plastically deforming that section 65 outwardly, typically by rocking it for caulking. The operation of caulking by rocking refers to a step of plastically deforming the section 65 to be caulked. The center axis $O_1$ of punch 67 is swung relative to the center axis $O_2$ of the bearing device of the wheel.

Figure 12:
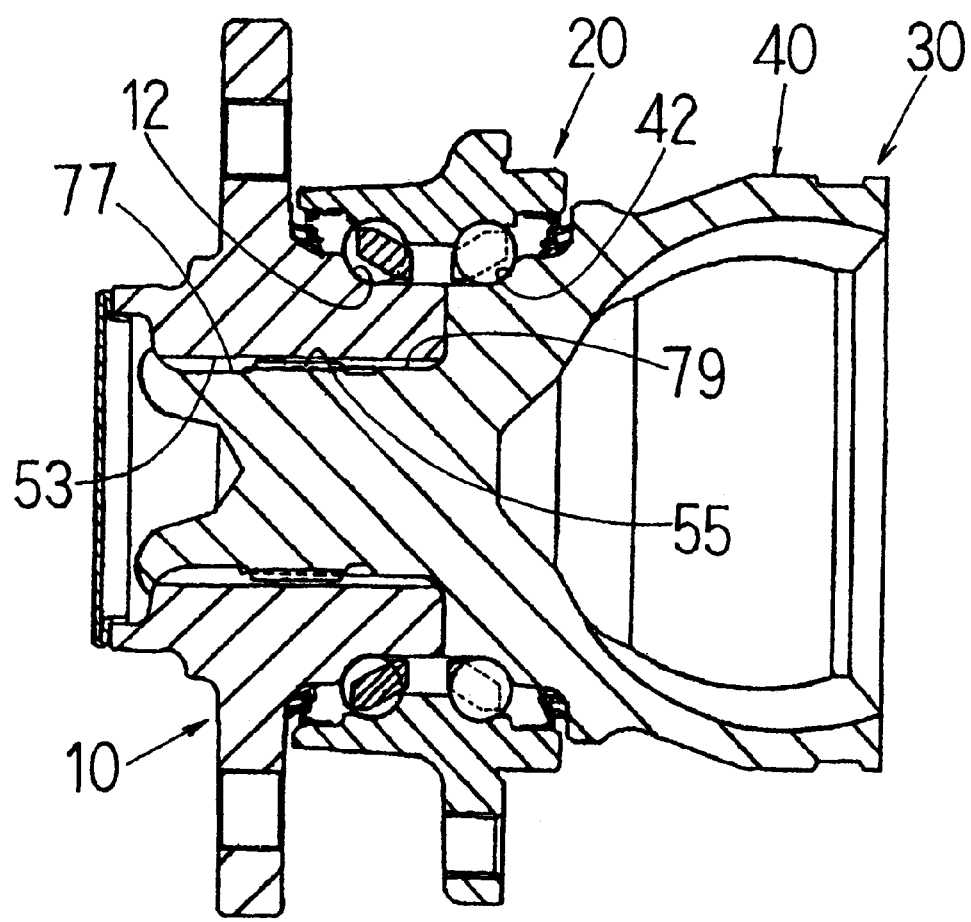
FIG. 12 is a cross sectional view of a known bearing device for a drive wheel.

As the punch 67 penetrates radially deep into the section 65 to be caulked exerting pressure toward the outer periphery of the section 65 in the deep area, the section 65 is plastically deformed toward the outer periphery. This occurs particularly at the base section thereof so that an outer peripheral part of the outer joint member 40 partially fills the voids in the undulations of the torque transmission means 51 at the side of the hub wheel 10 (the female serration 53). The filled area 69 is indicated by the dots in FIG. 2. In other words, the outer peripheral part bites the undulations (particularly the recesses and the tooth-front surface of the female serration 53 to be more precise) formed on the inner periphery of the hub wheel 10 in an area located near the outboard side end, and tightly contacts the inner peripheral surface of the hub wheel 10 in that area. As a result, any peripheral play between the hub wheel 10 and the outer joint member 40 is eliminated and the bearing device of the wheel becomes highly rigid to consequently improve the feeling for the driver and avoid-friction of the torque transmission means 51 when the car is in motion. The hub wheel 10 and the outer joint member 40 require only the ordinary level of precision of engagement and are not required to show an enhanced level of precision particularly in terms of coaxial arrangement as shown by the prior art of FIG. 12. Thus, the present invention does not entail any significant rise in manufacturing cost. Additionally, since the hub wheel 10 and the outer joint member 40 are held in tight contact with each other in the filled area 69, the radial load can be borne both in the filled area 69 as well as in the engaging section 61. Thus, the radial load is borne in the engaging section 61 and in the filled area 69 that are located at the axially opposite sides of the torque transmission means 51 to consequently improve the flexural rigidity (the moment bearing capacity) of the entire device.

While a rocking technique is used for the caulking operation in the above description, any other technique may alternatively be used so long as it can fill the gap on the torque transmission means 51 at the side of the hub wheel 10.

Figure 4:
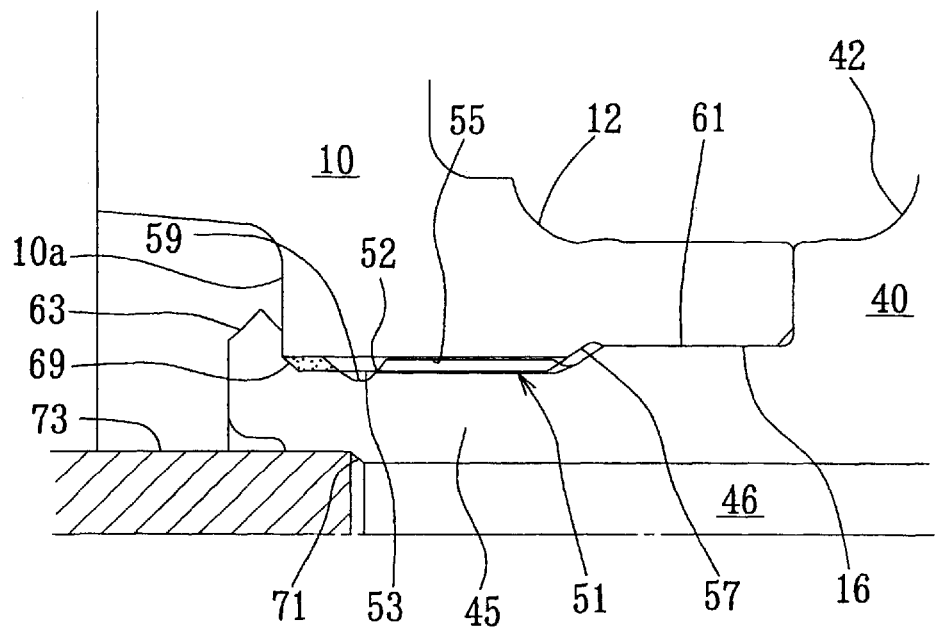
FIG. 4 is still another enlarged cross sectional view of the engaging areas of the hub wheel and the outer joint member of the embodiment of FIG. 1.
Figure 5:
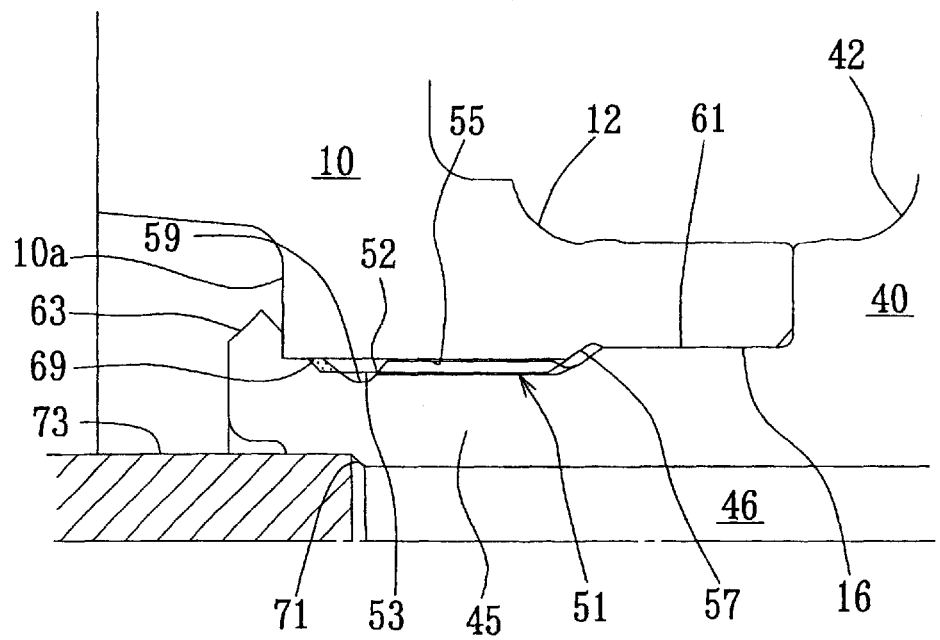
FIG. 5 is still another enlarged cross sectional view of the engaging areas of the hub wheel and the outer joint member of the embodiment of FIG. 1.
Figure 11:
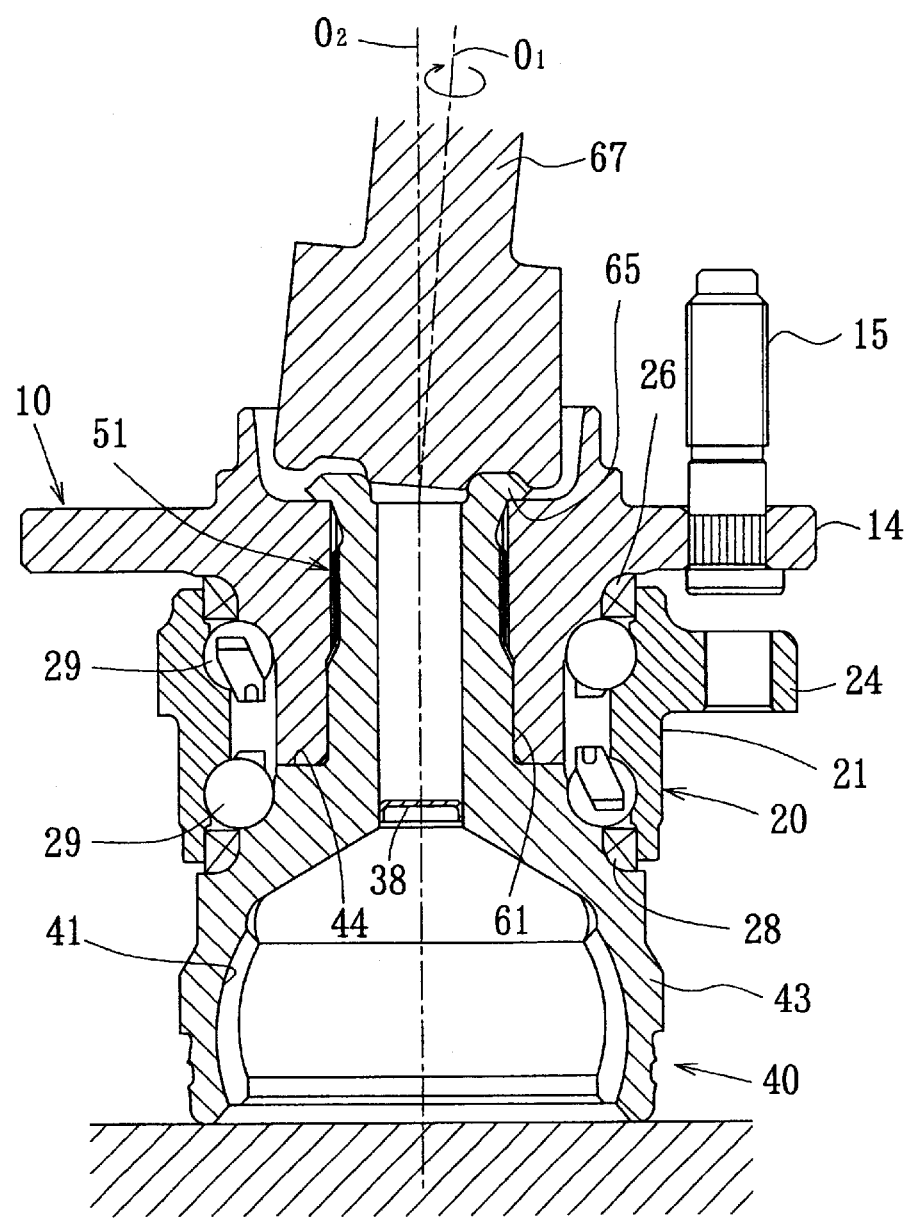
FIG. 11 is a cross sectional view of a bearing device for drive wheel, illustrating a caulking operation using a rocking technique.

Referring to FIG. 2, a step 71 is formed near the axial end of the inner peripheral surface of the outer joint member 40 so that the diameter of the through bore of the outer joint member 40 is enlarged at the outboard side from the viewpoint of the inner diameter of an axial central part. The portion of the outer joint member 40 that is located at the outboard side relative to the step 71 is plastically deformed toward the outer periphery of the outer joint member 40 in the caulking operation using a rocking technique as illustrated in FIG. 11. While the step 71 is located near the end face 10a of the hub wheel 10 in FIG. 2, it is located closer to the inboard side in FIG. 3 so as to enlarge the area to be plastically deformed toward the inboard side. With this arrangement, the filled area 69 is also extended toward the inboard side after the caulking operation to further eliminate the play between the hub wheel 10 and the outer joint member 40. FIG. 4 illustrates a process where a punch 73 or some other jig is used to enlarge the diameter of the through bore of the outer joint member 40 at the axial end to fill the gap much more. FIG. 5 illustrates an example where the female serration 53 of the hub wheel 10 is formed before the end face 10*a* of the hub wheel 10 to the inboard side. In this case, since it is necessary to shift the filled area 69 to the inboard side, a punch 73 or some other jig is used to enlarge the diameter of the through bore of the outer joint member 40 at the axial end to fill the gap much more similar to that shown in FIG. 4.

Meanwhile, when caulking the section 65 to be caulked in a manner as described above, measures have to be taken to prevent cracks from appearing in that section. Caulking related cracks can appear in the caulked section 63 while the bearing device is in use after the caulking operation. A conceivable cause of such caulking related cracks may, above all, be the concentrated strain in the caulked section 63 that is attributable to the its deformation. In the caulking operation, shearing strain is concentrated in a part located along the boundary of the male serration 55 and the section 65 to be caulked due to the difference between the rigidity of the axial end of the male serration 55 and that of the smooth section 65. In this way, as a result of caulking, the part is deformed remarkably, and cracks can appear in the caulked section 63.

Figure 6:
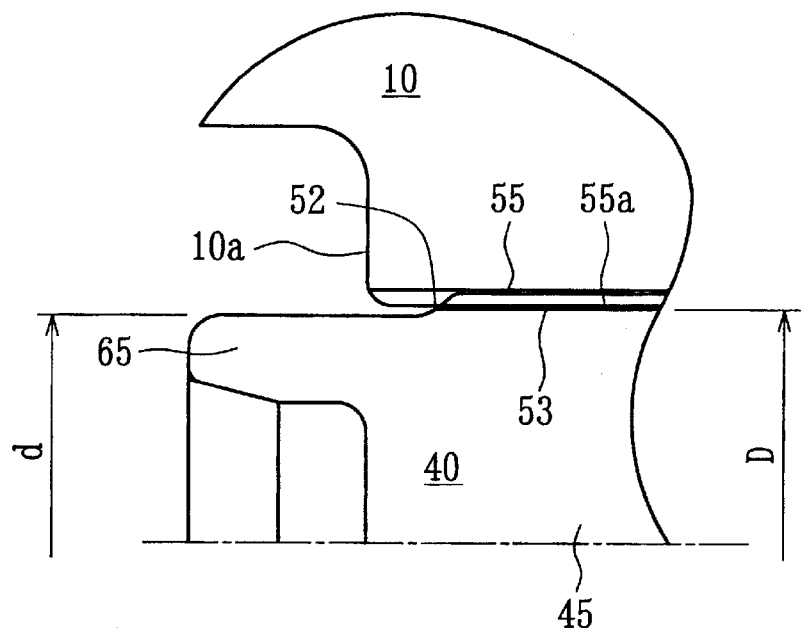
FIG. 6 is still another enlarged cross sectional view of the engaging areas of the hub wheel and the outer joint member of the embodiment of FIG. 1.
Figure 7:
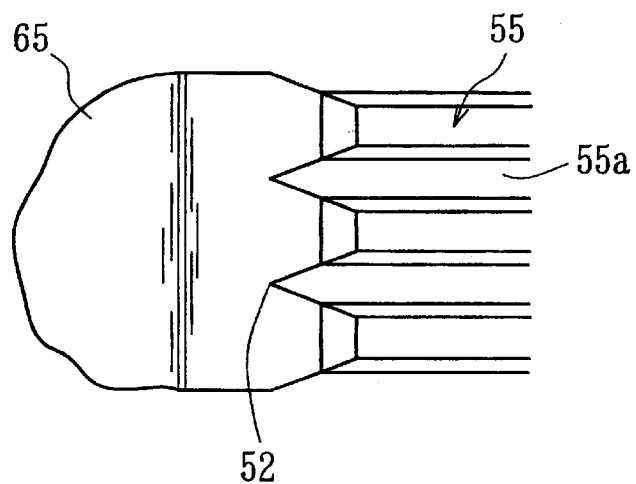
FIG. 7 is an enlarged plan view of the axial end of the male serration of the embodiment of FIG. 1.

With reference to FIGS. 6 and 7, measures that can be taken for the prevention of cracks include forming the male serration 55 in such a way that the outer periphery of the stem section 45 (or that of the section 65 to be caulked in this embodiment) shows at the axial end thereof a diameter smaller than that of the groove bottom 55*a* of the male serration 55. Also, cutting out the male serration 55 of the outer joint member 40 at the axial end (left in FIGS. 6 and 7) of the stem section 45 in such a way that the cut out section 52 is located at the inboard side relative to the end face 10*a* of the hub wheel 10. When the male serration 55 is cut out in the manner described above, the groove bottom 55*a* of the male serration 55 is cut straight in the axial direction to make an outer peripheral area of the section 65 to be caulked become open. As the axial end (cut out section 52) of the groove bottom 55*a* of the male serration 55 is located at the inboard side relative to the end face 10*a* of the hub wheel 10, the deformation that arises during the caulking operation is mainly found in the smooth and cylindrical section 65 to be caulked. In this way the concentrated shearing strain can be alleviated to minimize the risk of producing cracks. Another possible cause of caulking related cracks may be that the torque is borne excessively at the axial end of the serration-engagement area 51. More specifically, with ordinary serration-engagement, the male and female serrations 53 and 55 are circumferentially brought into mutual engagement by clearance fit giving rise to play. However, as the voids of the female serration 53 are filled by caulking, using plastic fluid in a manner as described above, the two serrations 53 and 55 are circumferentially brought into tight mutual engagement without any play so that the serration-engagement area 51 is forced to bear the torque excessively.

This problem may be removed by causing the two serrations 53 and 55 to be engaged with each other by interference at the side opposite to the axial end of the serration-engagement area, or at the inboard side. Then, a zone of interference fit is produced at the inboard side of the serration-engagement area to bear the torque so that the torque borne by the filled area 69 can be reduced to consequently reduce the risk of producing cracks in the caulked section 63.

A zone of interference fit can be produced at the inboard side by slightly tilting either the male serration 55 or the female serration relative to the axial line and causing the serration to show an angle of twist. The serration may be tilted over the entire length thereof or only in the part located at the inboard side so that the two serrations 53 and 53 remain in parallel with each other at the outboard side.

Caulking-related cracks may also be prevented from arising by observing the limit of the speed at which the caulking operation proceeds, taking the limit of the strain rate of the caulked section 63 into consideration.

The hub wheel 10 is formed by forging carbon steel containing carbon at 0.45 to 0.80% by weight. A hardened layer of around Hv510 to 900 is formed in an area extending from the base section of the flange 14 to the surface abutting the shoulder surface 44 of the outer joint member 40 by way of the surface (sealed surface) located vis-a-vis the seal 26 and the inner races 12. The small end face (surface abutting the shoulder surface 44) of the hub wheel 10 is hardened to HRC 50 or more, preferably HRC 58 or more, in order to prevent any reduction in the pre-load taking place due to the friction of the end face. A similar hardened layer (with Hv510–900) is also formed in an area of the inner peripheral surface of the hub wheel 10 extending from the cylindrical inner peripheral surface of the engaging section 61 to the female serration 53. The area of the cylindrical inner peripheral surface of the engaging section 61 is hardened to HRC 50 or more, preferably HRC 58 or more, in order to prevent fretting, unusual sounds, and a shortened service life from taking place when the inner races 12 and 42 are subjected to a bending moment by way of the balls 29. The female serration 53 is hardened to HRC 50 or more so that a satisfactory level of torque transmission may be ensured if the length of engagement of the serrations is very short (and slightly greater than ten millimeters), and friction and wear may be effectively prevented.

The outer joint member 40 is also formed by forging carbon steel containing carbon at 0.45 to 0.80% by weight and subjecting the carbon steel to heat treatment such as high frequency quenching. The hardened layer produced by the heat treatment with around Hv510 to 900 extends from the surface area (sealed surface) facing the seal 28 to the male serration 55 by way of the inner races 42, the shoulder surface 44, and the engaging section 61 (cylindrical outer peripheral surface). On the other hand, the axial end (the section 65 to be caulked) of the stem section 45 that is turned to the caulked section 63 requires a certain degree of ductility and consequently it is not subjected to quenching. In this way it is made to show the same degree of hardness (around Hv200 to 300) as carbon steel prior to heat treatment.

The small diameter end face of the hub wheel 10 and the area of the shoulder surface 44 of the outer joint member 40 that abut each other are preferably located at the inboard side relative to the center line P separating the balls 29. In this way both the torque transmission means 51 and the engaging section 61 may have a sufficient axial length.

Figure 8:
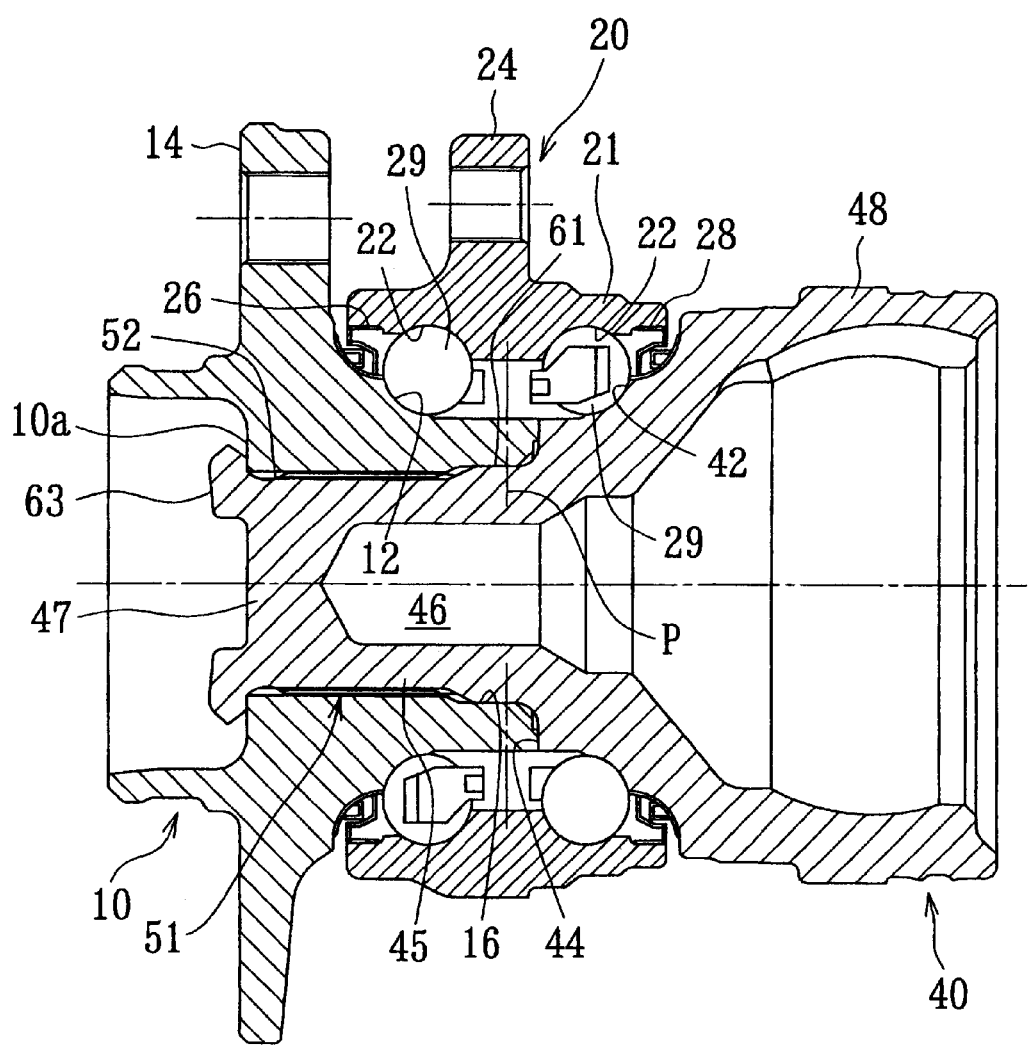
FIG. 8 is a cross sectional view of another embodiment of a bearing device for a drive wheel according to the invention.

FIG. 8 schematically illustrates an embodiment of the bearing device for a drive wheel according to the invention, wherein the stem section 45 of the outer joint member 40 is made to contain a solid section 47 at the axial end, and at the left side in FIG. 8. The solid section 47 is provided to improve the processing, typically a form rolling process, of the male serration 55 arranged at the outer periphery of the stem section 45. For this purpose, the male serration 55 is formed in such a way that it is partially (as shown in FIG. 8) or entirely contained in an outer peripheral area of the solid section 47.

Figure 9:
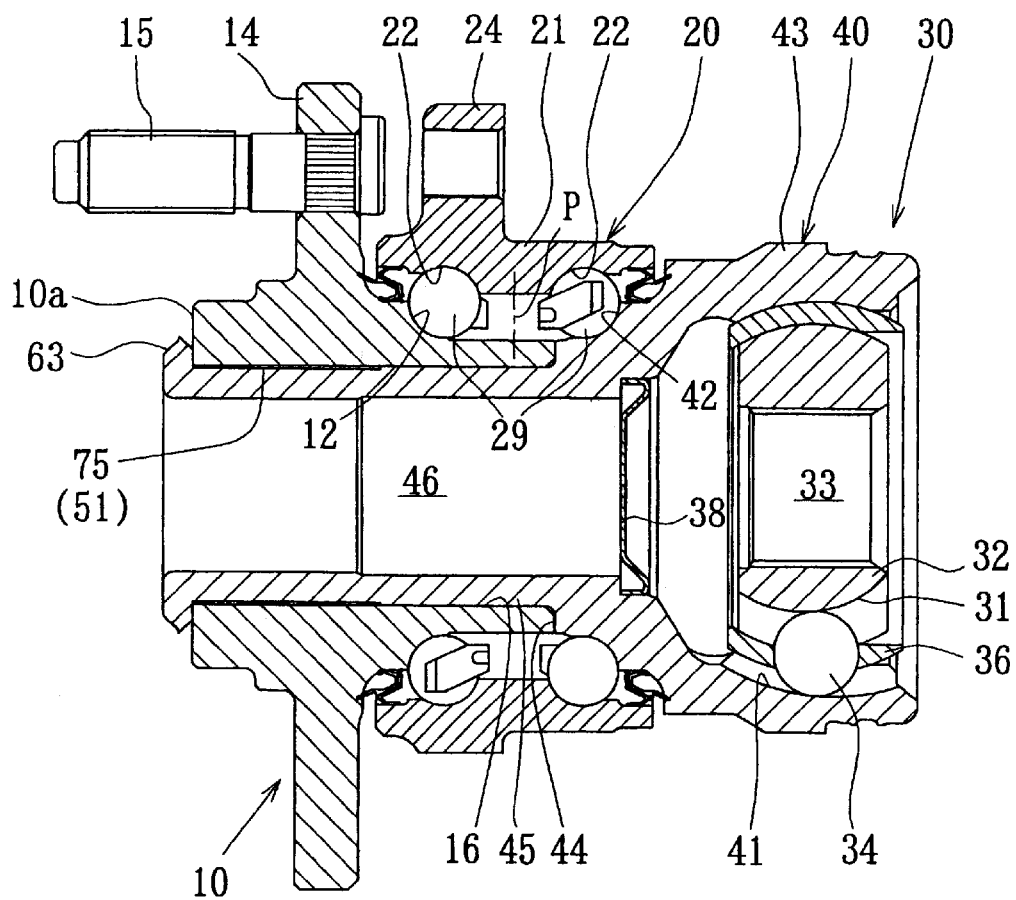
FIG. 9 is a cross sectional view of still another embodiment of a bearing device for a drive wheel according to the invention.

FIG. 9 schematically illustrates an embodiment of the bearing device for a drive wheel according to the invention. In FIG. 9 undulations 75 are provided on the engaging surfaces of the hub wheel 10 and the outer joint member 40. The diameters of the engaging surfaces including the undulations 75 are partially enlarged and caulked. The undulations 75 may typically be formed by knurling the outer peripheral surface of the stem section 45. The diameter of the engaging surfaces may be enlarged and then caulked typically by forcibly introducing a caulking jig having an outer diameter greater than the inner diameter of the through bore 46 of the stem section 45. The caulking jig is introduced into the through bore 46 under pressure and the stem section 45 is expanded from the inner periphery toward the outer periphery. As a result of the caulking operation, the undulations 75 of the stem section 45 bite the inner peripheral surface of the hub wheel 10 to plastically couple the hub wheel 10 and the outer joint member 40. As an effect of the biting of the undulations 75, a torque can be transmitted from the hub wheel 10 to the stem section 45, or vice versa. In other words, the undulations 75 operate as torque transmission means like that of FIG. 1.

After enlarging the diameters and caulking the engaging surfaces, the axial end of the stem section 45 projecting from the end face 10a of the hub wheel 10 is subjected to a caulking operation using a rocking technique as described earlier with reference to FIG. 1. In this way the axial end is caulked toward the outer periphery and becomes engaged with the end face 10a of the hub wheel 10. As a result, the voids in the undulations 75 are satisfactorily filled providing a strong binding effect as in the case of FIG. 1.

It may be appreciated that, while the binding effect is obtained by enlarging the diameters of the engaging surfaces carrying undulations 75, a similar effect can be obtained by reducing the diameters of the engaging surfaces. For instance, the diameters of the engaging surfaces may be reduced and the surfaces may be caulked by pressing the hub wheel 10 from the outer periphery toward the inner periphery thereof. While the undulations may be hardened when they are produced by machining, they become even harder when subjected to heat treatment such as high frequency quenching. In this way the undulations 75 are difficult to crush and can easily bite the engaging surface of the partner member to establish a strengthened plastic coupling effect.

Figure 10:
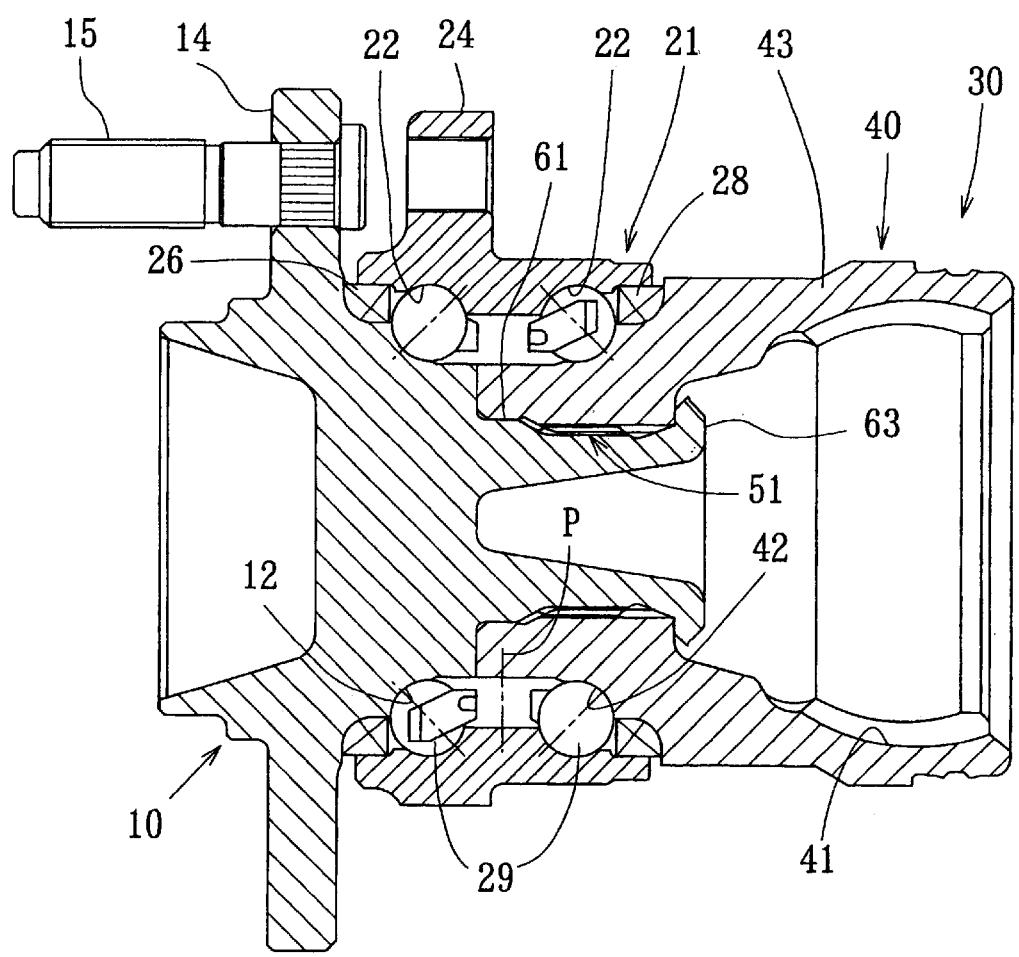
FIG. 10 is a cross sectional view of still another embodiment of a bearing device for a drive wheel according to the invention.

FIG. 10 is a schematic illustration of another embodiment of bearing device for a drive wheel according to the invention, where the hub wheel 10 is brought into engagement with the inner periphery of the outer joint member 40. More specifically, the hub wheel 10 is caulked at an end (located at the inboard side) and made to engage the bottom of-the mouth section 43 of the outer joint member 40. With this arrangement again, torque transmission means 51 (serrations in the case of FIG. 7) is arranged between the hub wheel 10 and the outer joint member 40. The voids of the female serration arranged on the inner periphery of the outer joint member 40 are filled as a result of a caulking operation conducted near the caulked section 63 to provide a strong binding effect as in the case of FIGS. 1 and 6. Otherwise, this embodiment is the same as those of FIGS. 1 and 6 with the same or similar components to those of the preceding embodiments and the same reference symbols. It will consequently not be described any further.

As described above in detail, according to the invention, there is no circumferential play left between the hub wheel and the outer joint member. Consequently, the strength of binding the hub wheel and the outer joint member is raised to improve the rigidity of the bearing device for a drive wheel. Additionally, since the engaging areas of the hub wheel and the outer joint member require only an ordinary level of machining precision, a bearing device according to the invention does not involve any significant increase in manufacturing cost.

Any possible concentration of the shearing load in the section to be caulked can be avoided when the serration of the outer joint member is cut out at the axial end and at least the end of the groove bottom of the serration is located at the inboard side relative to the corresponding end face of the hub wheel. This prevents caulking-related cracks from occurring and improves the strength of coupling of the hub wheel and the outer joint member. A similar effect can be obtained by using interference for the serration-engagement at least at the side opposite to the axial end.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A bearing device for a drive wheel comprising a hub wheel, a constant velocity universal joint and bearings arranged in rows, said hub wheel, said universal joint and said bearings being unitized, said plurality of inner races of the bearings being formed partly in an outer joint member of said constant velocity universal joint at a side thereof;

said hub wheel and said outer joint member being meshed with each other by way of torque transmission means and coupled to each other by caulking, wherein said hub wheel and said outer joint member are formed from carbon steel and subjected to a heat treatment, wherein plastic deformation caused by said caulking supports said torque transmission means at and near a caulked section, and wherein said caulked section exhibits a same degree of hardness as carbon steel prior to heat treatment.

2. A bearing device for a drive wheel comprising a hub wheel, a constant velocity universal joint and bearings arranged in rows, said hub wheel, said universal joint and said bearings being unitized, said plurality of inner races of the bearings being formed partly in an outer joint member of said constant velocity universal joint at a side thereof;

said hub wheel and said outer joint member being meshed with each other by way of torque transmission means and coupled to each other by caulking, wherein said hub wheel and said outer joint member are formed from carbon steel and subjected to a heat treatment, wherein undulations of said torque transmission means at and near a caulked section are filled with a plastic deformed part caused by said caulking, and wherein said caulked section exhibits a same degree of hardness as carbon steel prior to heat treatment.

3. The bearing device for a drive wheel according to claim 1 or 2, further comprising said caulked section at one end of the torque transmission means in an axial direction and an engaging section engaged at the other end with the hub wheel and the outer joint member without play.

4. The bearing device for a drive wheel according to claim 1 or 2, wherein
said torque transmission means comprises serrations.

5. The bearing device for a drive wheel according to claim 4, wherein
said outer joint member is provided at the corresponding axial end thereof with a caulked section having a diameter smaller than that of its serration groove.

6. The bearing device for a drive wheel according to claim 4, wherein
said serrations of said outer joint member are made to show a cut-out profile at the corresponding axial end thereof.

7. The bearing device for a drive wheel according to claim 6, wherein
said serration of said outer joint member is made to have the axial end of the bottom of the groove thereof located at the inboard side relative to the corresponding end face of the hub wheel.

8. The bearing device for a drive wheel according to claim 4, wherein
the serration-engagement of said outer joint member and that of said hub wheel is realized by interference at least at the side opposite to the axial end side.

9. The bearing device for a drive wheel according to claim 8, wherein
said serration-engagement is realized by clearance fit at the axial end side.

10. The bearing device for a drive wheel according to claim 8, wherein
either the serration of said outer joint member or that of said hub wheel is inclined relative to the axial direction.

11. The bearing device for a drive wheel according to claim 8, wherein
either the serration of said outer joint member or that of said hub wheel is inclined relative to the axial direction at the side opposite to the axial end and formed in parallel with the axial direction at the axial end side.

12. The bearing device for a drive wheel according to claim 1 or 2, wherein
said outer joint member is engaged at the corresponding axial end thereof with the hub wheel by caulking.

13. The bearing device for a drive wheel according to claim 1 or 2, wherein
said hub wheel is engaged at the corresponding end thereof with the outer joint member by caulking.

14. The bearing device for a drive wheel according to claim 1 or 2, wherein
said torque transmission means is formed by arranging undulations on engaging surfaces of said hub wheel and said outer joint member and caulking said engaging surfaces by at least partly enlarging or reducing diameters of said engaging surfaces including said undulations.

15. The bearing device for a drive wheel according to claim 14, wherein
said undulations are formed on either or both of the engaging surfaces of said hub wheel and said outer joint member.

16. The bearing device for a drive wheel according to claim 14, wherein
said undulations are hardened by heat treatment.

* * * * *